T. P. WALSH.
MACHINE FOR SELECTING, SPOOLING, SHEARING, AND DRAWING-IN YARN FOR AXMINSTER LOOMS.
APPLICATION FILED NOV. 20, 1909.

1,275,183.

Patented Aug. 6, 1918.
9 SHEETS—SHEET 5.

Witnesses:
Edward Maxwell
Wm. J. Pike

Inventor:
Thomas P. Walsh,
by Geo. H. Maxwell,
Attorney.

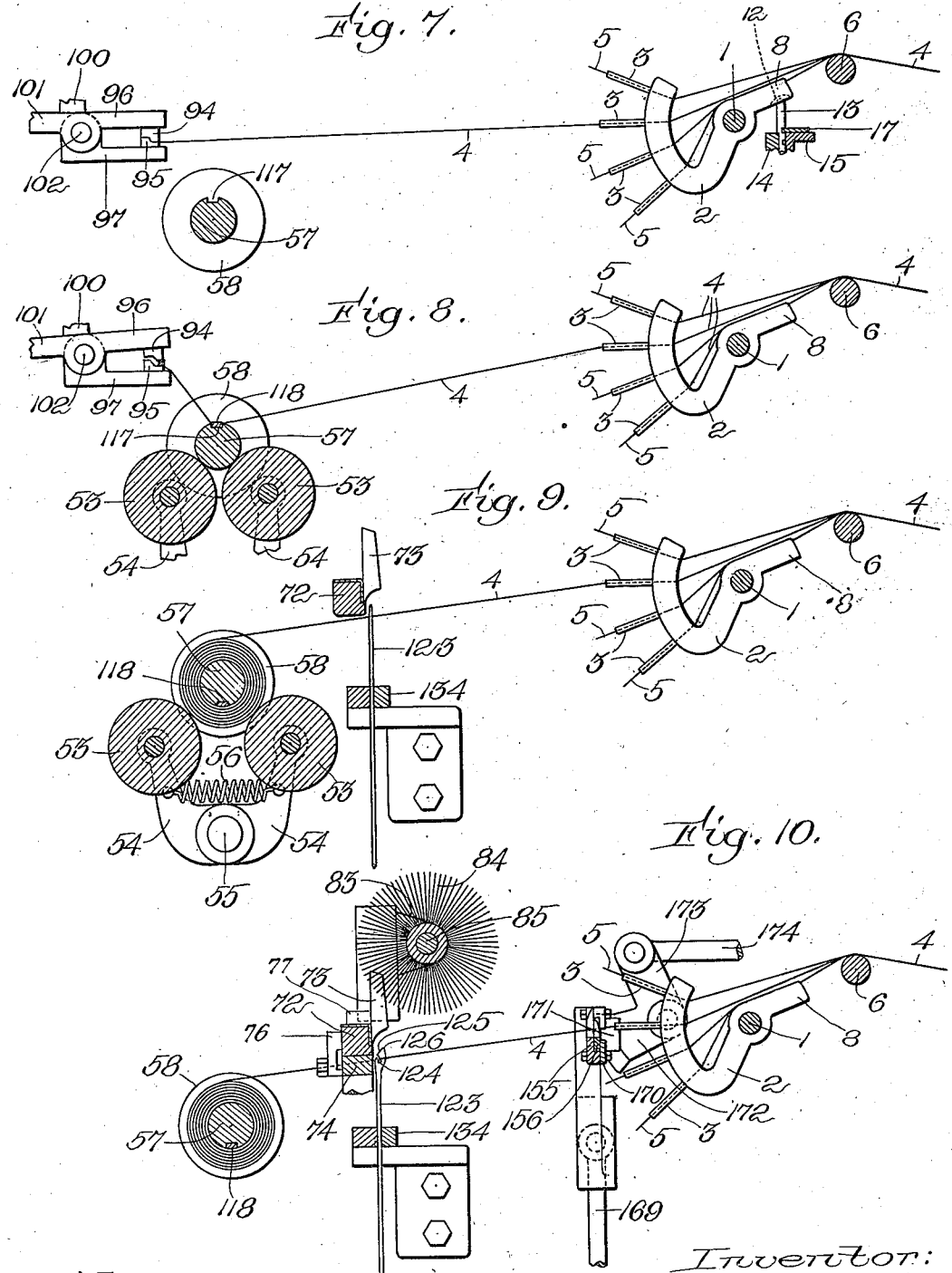

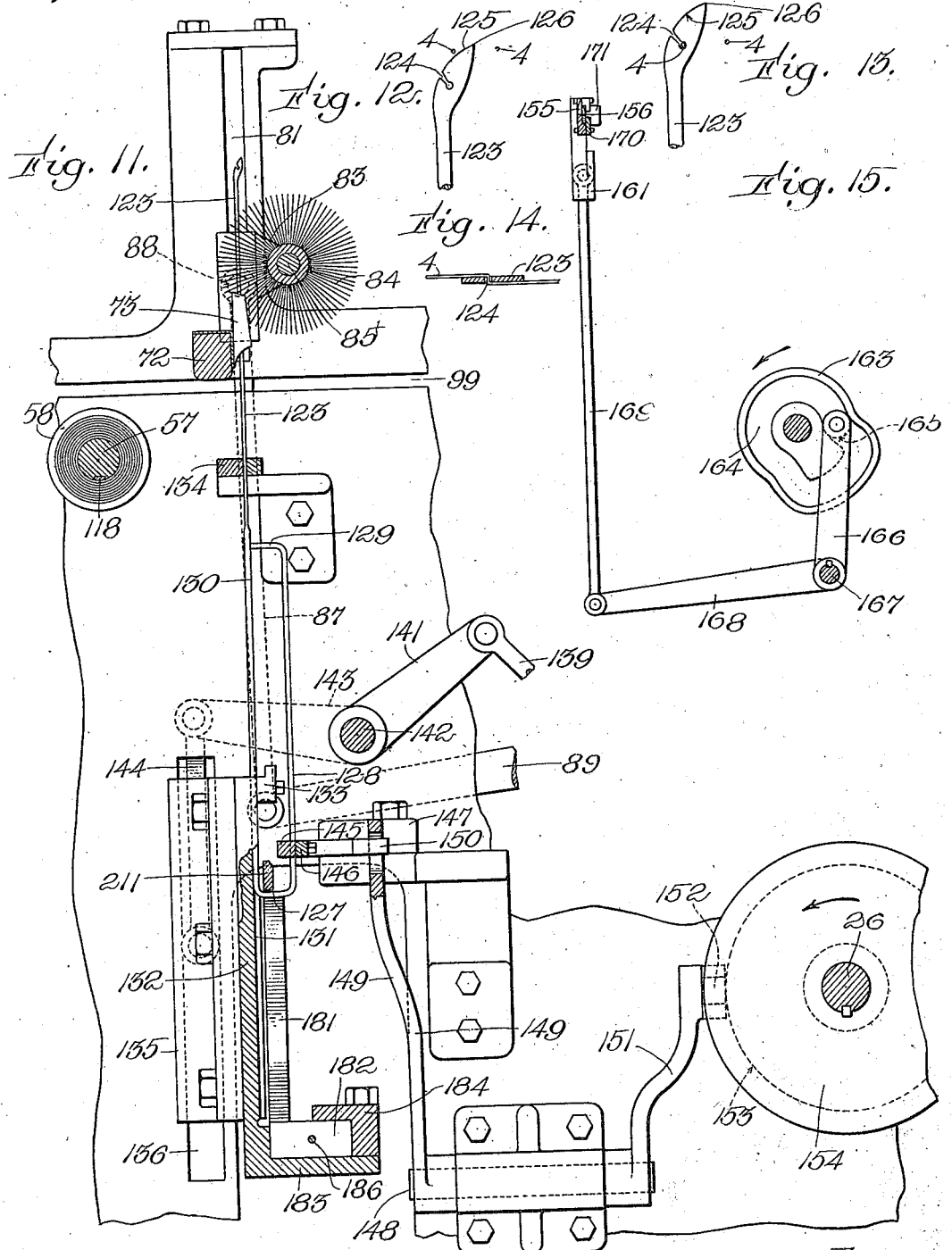

T. P. WALSH.
MACHINE FOR SELECTING, SPOOLING, SHEARING, AND DRAWING-IN YARN FOR AXMINSTER LOOMS.
APPLICATION FILED NOV. 20, 1909.
1,275,183.
Patented Aug. 6, 1918.
9 SHEETS—SHEET 8.
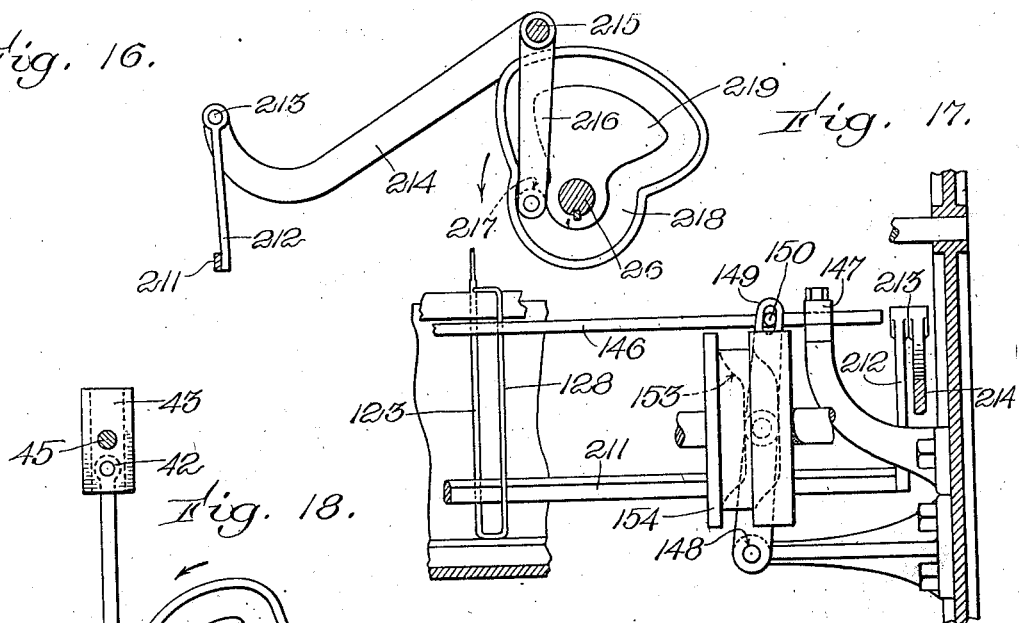
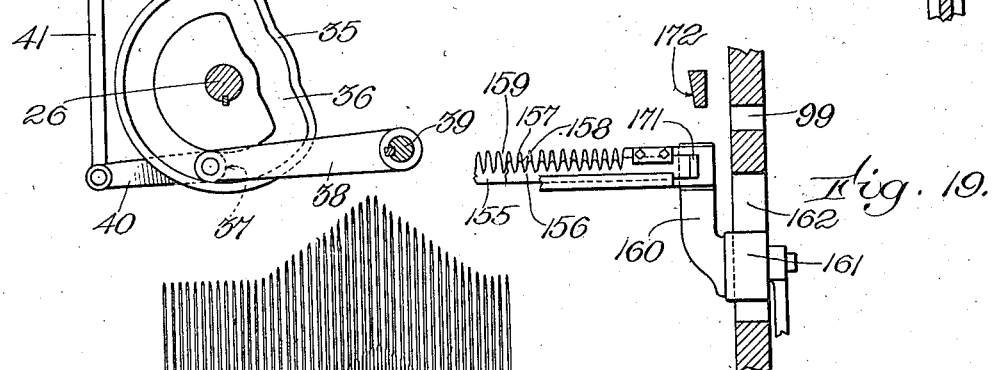
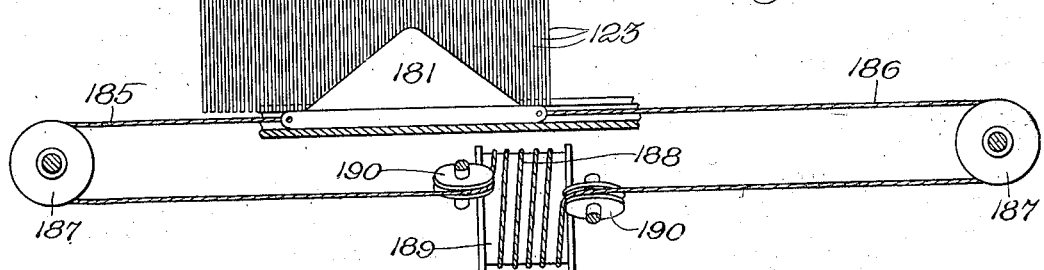
Witnesses:
Edward Maxwell
Wm. J. Pike
Inventor:
Thomas P. Walsh,
by Geo. H. Maxwell,
Attorney.

T. P. WALSH.
MACHINE FOR SELECTING, SPOOLING, SHEARING, AND DRAWING-IN YARN FOR AXMINSTER LOOMS.
APPLICATION FILED NOV. 20, 1909.
1,275,183.
Patented Aug. 6, 1918.
9 SHEETS—SHEET 9.
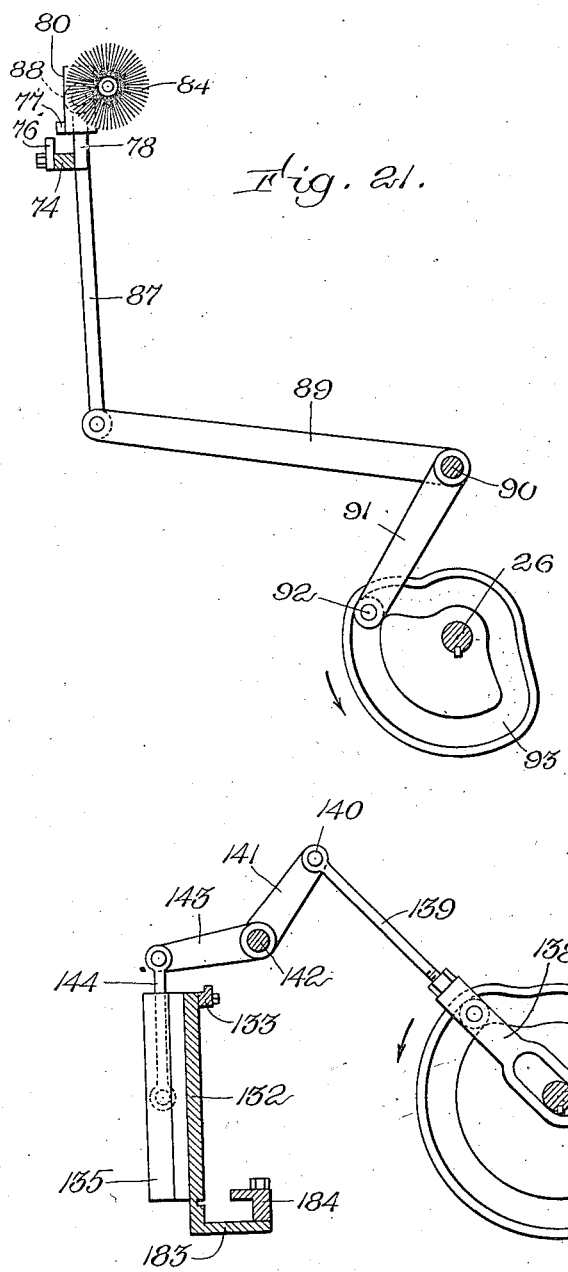
Fig. 21.
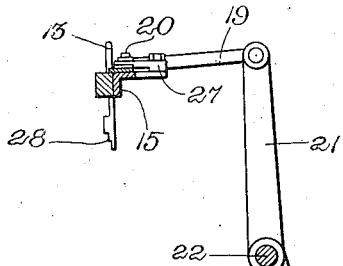
Fig. 22.
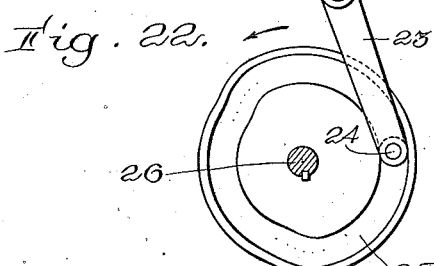
Fig. 23.
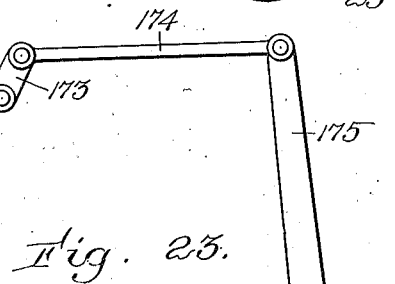
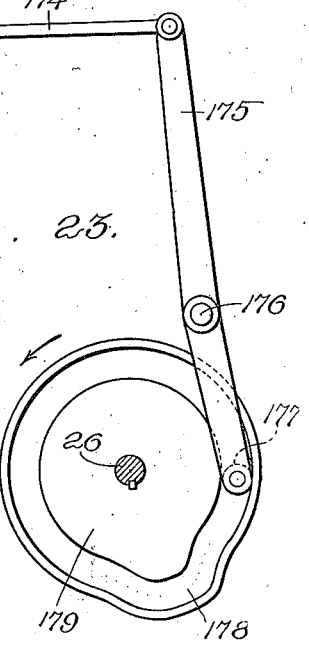
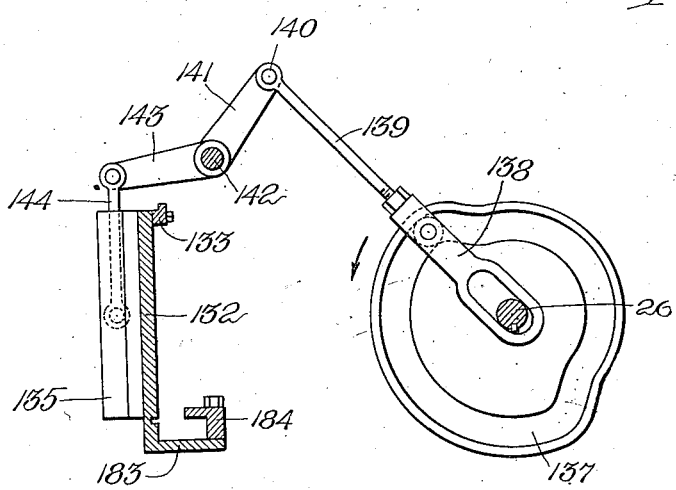
Fig. 24.
Witnesses:
Edward Maxwell
Wm. J. Pike.
Inventor:
Thomas P. Walsh,
by Geo. H. Maxwell,
Attorney

UNITED STATES PATENT OFFICE.

THOMAS P. WALSH, OF BOSTON, MASSACHUSETTS, ASSIGNOR, BY MESNE ASSIGNMENTS, TO AMERICAN WARP-DRAWING MACHINE COMPANY, A CORPORATION OF MAINE.

MACHINE FOR SELECTING, SPOOLING, SHEARING, AND DRAWING IN YARN FOR AXMINSTER LOOMS.

1,275,183.

Specification of Letters Patent.   Patented Aug. 6, 1918.

Application filed November 20, 1909. Serial No. 529,007.

*To all whom it may concern:*

Be it known that I, THOMAS P. WALSH, a citizen of the United States, and resident of Boston, in the county of Suffolk and State of Massachusetts, have invented an Improvement in Machines for Selecting, Spooling, Shearing, and Drawing in Yarn for Axminster Looms, of which the following description, in connection with the accompanying drawings, is a specification, like letters on the drawings representing like parts.

In weaving Axminster and moquette carpets, each line or pick of tufts is derived from a separate spool, each spool being wound with separate lengths of yarn side by side, varying in color according to the pattern of the particular line or pick of tufts which that spool is to furnish in the complete pattern. To maintain the projecting ends of these successive lengths of yarn in exact relative position ready for instant weaving when the turn of that spool is reached in the weaving process, a tube frame is secured to each spool carrying a series of small transverse tubes, one for each of said projecting ends of the yarn. Accordingly my present invention aims to accomplish the automatic selection of the different colors and strands of yarn and the threading or drawing-in and spooling and shearing of the same, all by one and the same machine, so that all the operator has to do is to place the spool and its tube frame in proper position in the machine, whereupon the machine provides the requisite complement of the different yarns on the spool in fully threaded and sheared position ready for removal and direct use in the loom. In other words, it is the object of my invention to eliminate all the slow, laborious, skilled labor which has heretofore attended this end of the weaving process in connection with Axminster weaving.

In carrying out my invention, I provide selective mechanism which holds the free ends of the maximum number of threads or pieces of yarn which may be required for all the varieties of filled spools which it may be desired to prepare, said mechanism delivering to automatic winding and drawing-in mechanisms the particular set of yarns required for any given spool, the yarns being sheared or severed from the selective mechanism, so that the spool is not only wound with exactly the yarns and colors required, but the tube frame is threaded with said yarns, and they are left preferably in truly sheared position in the tubes of said frame.

In the accompanying drawings, in which I have shown a preferred embodiment of my invention, Figure 1 is a view of the machine in side elevation, partly broken away, showing the machine in position ready for spooling;

Figs. 6–11 are similar sectional views showing the parts in their successive operative positions;

Figs. 12–14 show in side elevation and cross section details of the pusher, to illustrate the manner of its engagement with a yarn;

Fig. 15 is a similar sectional view of the shearing device;

Fig. 16 is a sectional view showing in side elevation a safety device;

Fig. 17 is a sectional view showing in rear elevation the mechanism which turns the thread-pushers;

Fig. 18 is a sectional view showing in side elevation a detail of the pattern-lifting mechanism;

Fig. 19 is a sectional view showing in rear elevation a portion of the shearing mechanism;

Fig. 20 is a sectional view showing in front elevation the mechanism which raises the pushers;

Fig. 21 is a sectional view showing in side elevation a portion of the carrying mechanism of the tube frame;

Fig. 22 is a similar view of a portion of the selecting mechanisms;

Fig. 23 is a similar view of the operating mechanism which gives the shearing movement to the shears or yarn cutters; and Fig. 24 is a similar view of a portion of the operating mechanism of the thread-pushers.

In order that my machine may be more readily understood, I will state briefly its parts and general operation. The yarn is supplied from any suitable source, such as a usual creel frame (not shown), carrying as many different spools of yarn as may be desired. From this source the yarn is led through a tension device to the selective mechanism, which automatically brings into line with drawing devices those particular yarns which are required for the given spool and tube frame, whereupon said drawing devices position the ends of these selected yarns over the spool which is to be wound, to which they are clamped in usual manner. The spool is then wound with the required length of the yarns. Then each yarn is engaged by a pusher which grips the yarn so that it cannot readily escape, whereupon all the yarns are sheared evenly, across the machine, and the pushers continue their movement, pushing the yarns through the tubes of the tube frame, releasing said yarns in such position that their free ends project from the tubes, where they are retained while the pushers move out of the way. This completes the operation.

Figure 5:
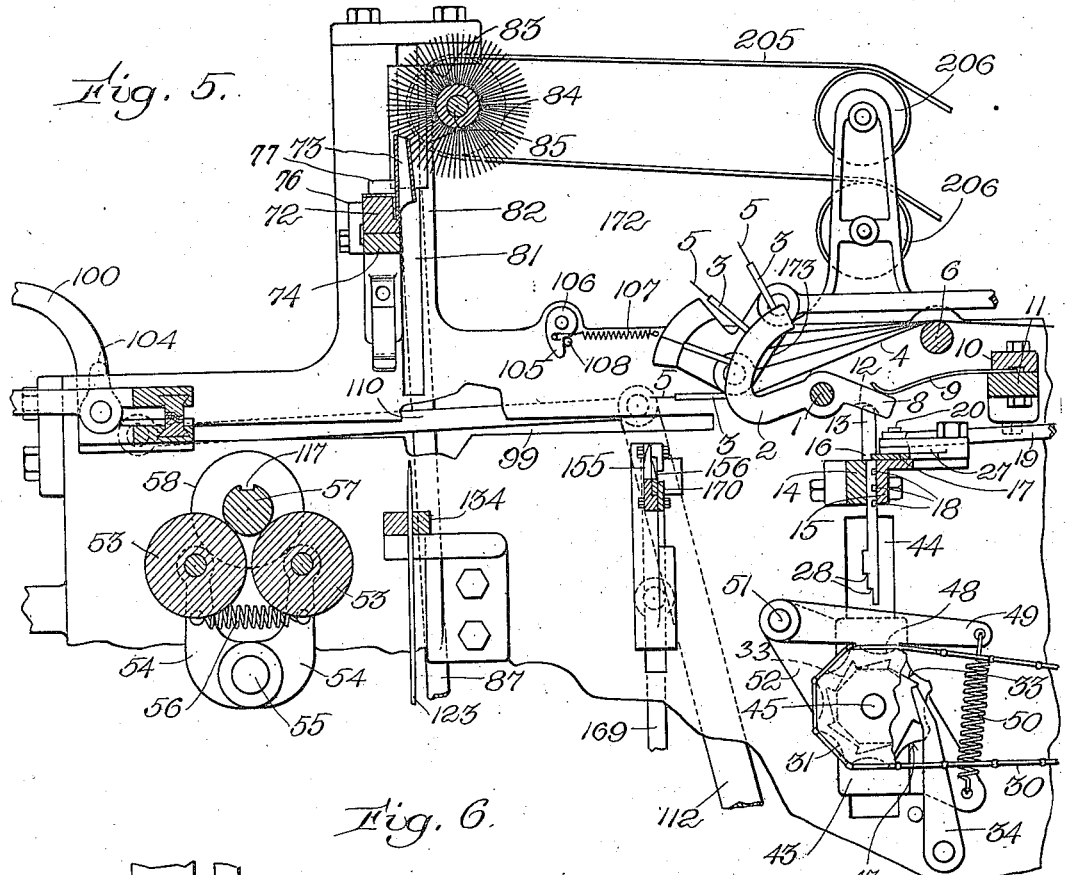
Fig. 5 is an enlarged transverse sectional view.
Figure 6:
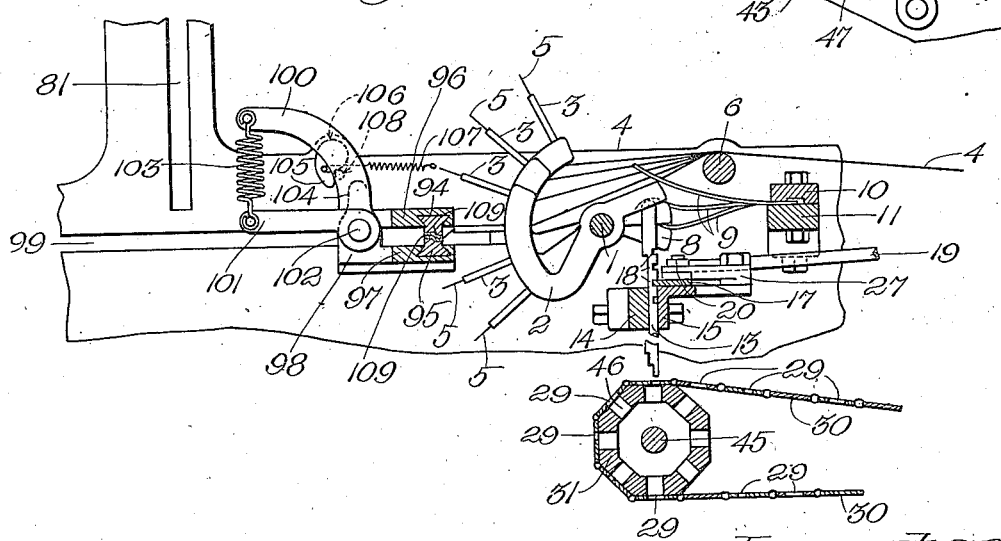

Referring now to the detailed construction,—loosely mounted on a transverse shaft 1 is a series of holder frames 2, each provided with a plurality of tubular holders 3 corresponding in number to the number of colors which it is desired to handle, the yarns 4 passing through said holders, as shown in Figs. 5 and 6, so as to project slightly therefrom as indicated at 5. For instance, the top yarn will be red, the next one black, the next blue, and the bottom one green, in each frame. The yarns are led over a stationary guide rod 6 from friction bars or rods 7, which provide the requisite tension, take out snarls, etc., as the yarns come from the creel, before mentioned, but not shown. Each yarn-holder frame is provided with a rearwardly extending tail piece 8 normally held downward by a spring 9 clamped by a clamping bar 10 onto a transverse beam 11, said tail pieces being recessed at 12 on their under sides to receive the upper end of lifters 13 mounted for free sliding movement in vertical slits in the rear side of a transverse beam or brace 14, being held in at their sides by a plate 15 bolted at its ends to said beam 14. The lifters 13 are limited in their downward movement by stops 16, and are locked in all positions by a knife-like locking plate 17 which engages notches 18 cut into the rear edges of the lifters 13 at distances apart so that when the locking plate 17 engages in one notch of a lifter, the yarn-holder frame will be positively held so as to bring into true horizontal position the particular holder 3 thereof which corresponds to the given notch so engaged. This insures that the holders shall be maintained stationary until the yarn has been severed. The locking plate 17 is connected at its ends to links 19 pivoted thereto at 20 and actuated by arms 21 fast on a rock shaft 22 rocked by a lever 23 whose roll 24, see Fig. 22, travels in a path cam 25 fast on a cam shaft 26, said locking plate being held in proper sliding position by stationary overhanging brackets 27 adjacent its opposite ends. At their lower ends the lifters 13 are provided with notches or stops 28 to coöperate with apertures 29 in a pattern chain 30, herein shown as operated by a pattern cylinder 31, said chain passing over curved guides 32 which serve the double purpose of holding the chain away from the working parts of the machine and also keeping it tight on its actuating cylinder 31. I wish it understood that, while I prefer the particular pattern mechanism herein shown, I do not intend to limit my invention thereto, as various well known pattern mechanisms may be adapted to my machine within the scope of its broader claims. The required step-by-step movement of the pattern chain is secured by a ratchet 33 engaged by a stationary pawl 34, in connection with an up and down movement of the cylinder 31 communicated by a cam 35, Fig. 18, in whose path 36 travels the cam roll 37 of a lever 38 fast on a rock shaft 39 which extends across the machine and is provided at its opposite ends with arms 40 for raising and lowering links 41 pivoted at 42 to slides 43 movable in slots 44 in the end standards of the machine, in which slides the shaft 45 of the pattern cylinder is mounted to turn. The pattern cylinder has slits or holes 46 to receive the projecting lower ends of the lifters 13 when the cylinder is raised by said cam 35. The pattern cylinder is rotated one step, thereby bringing into top position the next card of the chain so that its holes 29 are in line beneath the series of lifters 13, whereupon the pattern cylinder and chain are lifted, thereby engaging the lower notched ends of the successive lifters 13 and lifting them according to the size of the holder 29 provided for each lifter, the lifters being raised to different distances so as to bring the particular holder 3, and hence color of yarn, into operative horizontal position as called for by the pattern. At one end the pattern cylinder 31 is provided with a dwell wheel 47 whose dwells or notches correspond to the required positions of the cylinder, being engaged by the depending portion 48 of a lever 49 held downwardly by a spring 50 and pivoted at 51 to a bracket 52 on the adjacent slide 43.

The spool which is to receive the yarns selected, is mounted in any suitable position in front of the selective mechanism above described, presser rolls 53 being shown as mounted on arms 54 pivoted together at 55 and normally held toward each other by springs 56 in position to receive the spool 57 which is to be wound, said spool being controlled as to its endwise position by its end flanges 58. Opposite friction disks or plates 59, 60 are provided to engage said flanged ends 58 of the spool 57, being fast on the inner ends of shafts 61, 62, the former constituting the driving shaft, operated by a belt pulley 63, said two shafts having endwise movement, to permit the placing of the spool 57, controlled by forks 64 engaging grooves 65 in the ends of the shafts, said forks being pivoted at 66 to the frame of the machine and normally held outward by springs 67 and moved inwardly by a foot lever 68 connected thereto by a rod 69, T lever 70, and links 71. The tube frame (comprising a usual wooden carrier 72 and series of long, thin tin tubes 73) for the spool, is held in required position in the machine by a transverse support or carrier 74 on which it is positioned endwise by its own end brackets 75 (which are always a part of the tube frame, their function being to retain the tube frame on the yarn spool when used subsequently in the loom) and is held at the front by end buttons or pivoted clamps 76 and at the top by similar top buttons or clamps 77, the former being pivoted on the horizontal portion 74 of the support and the latter pivoted on the upright end portions 78 of said support or carrier, whence the latter projects angularly, as clearly shown in Fig. 3, at 79 at its opposite ends, which are shaped to constitute slides 80 held in true vertical position in guides 81 formed in uprights 82 projecting upwardly from the main frame of the machine. This angular end portion 79 extends rearwardly slightly, as shown in Fig. 5, to constitute a carrying bracket 83, in which is journaled a brush 84 whose shaft 85 is driven by a pulley 86, and said entire support, with the tube frame and brush, are moved up and down at set times by links 87 pivoted to pins or fingers 88 projecting from the slides 80, said links being actuated by arms 89, Fig. 21, projecting rigidly from a rock shaft 90 operated by a lever 91 whose cam roll 92 travels in a path cam 93 fast on the cam shaft 26.

Figure 1:
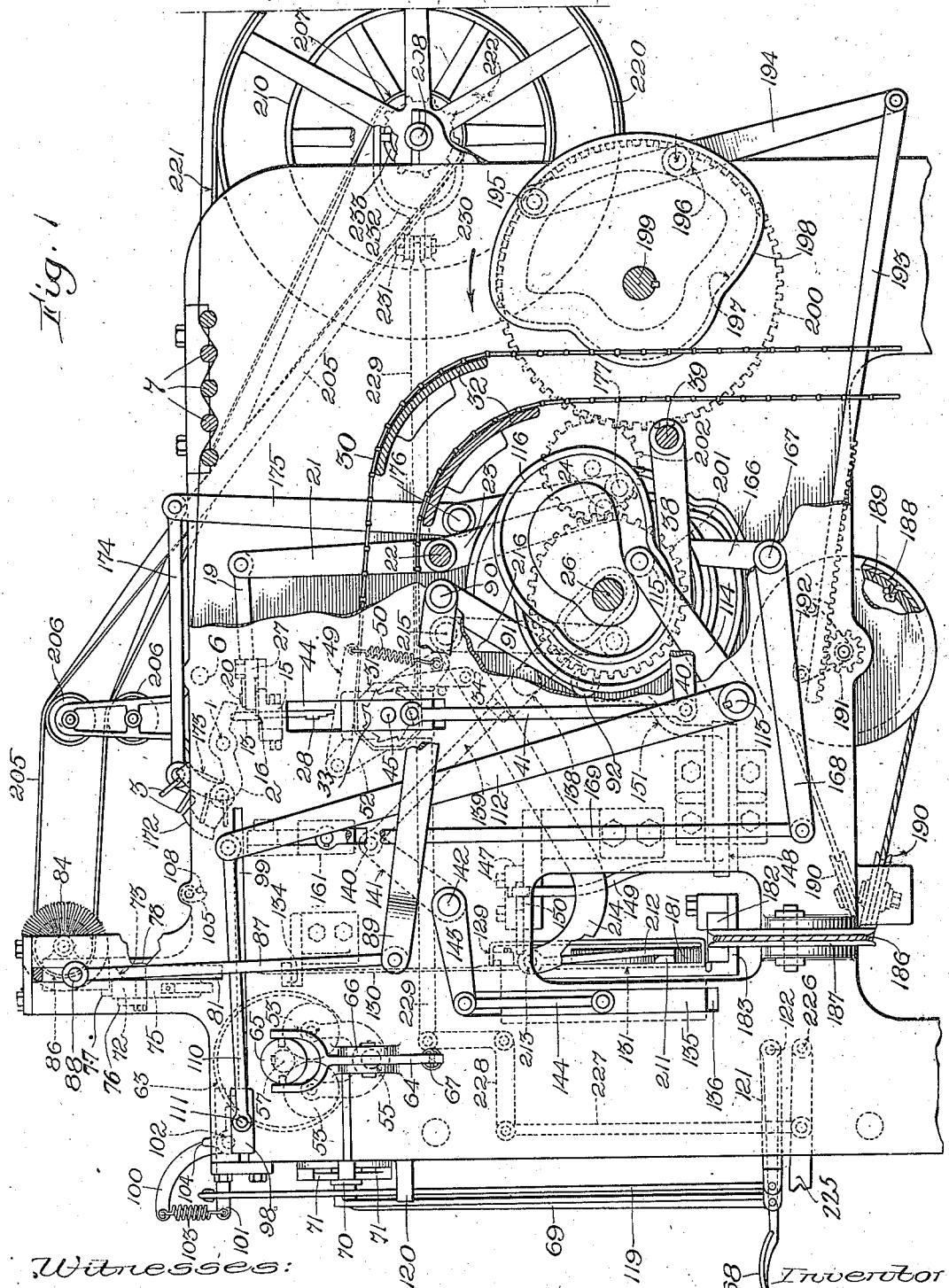
Figure 2:
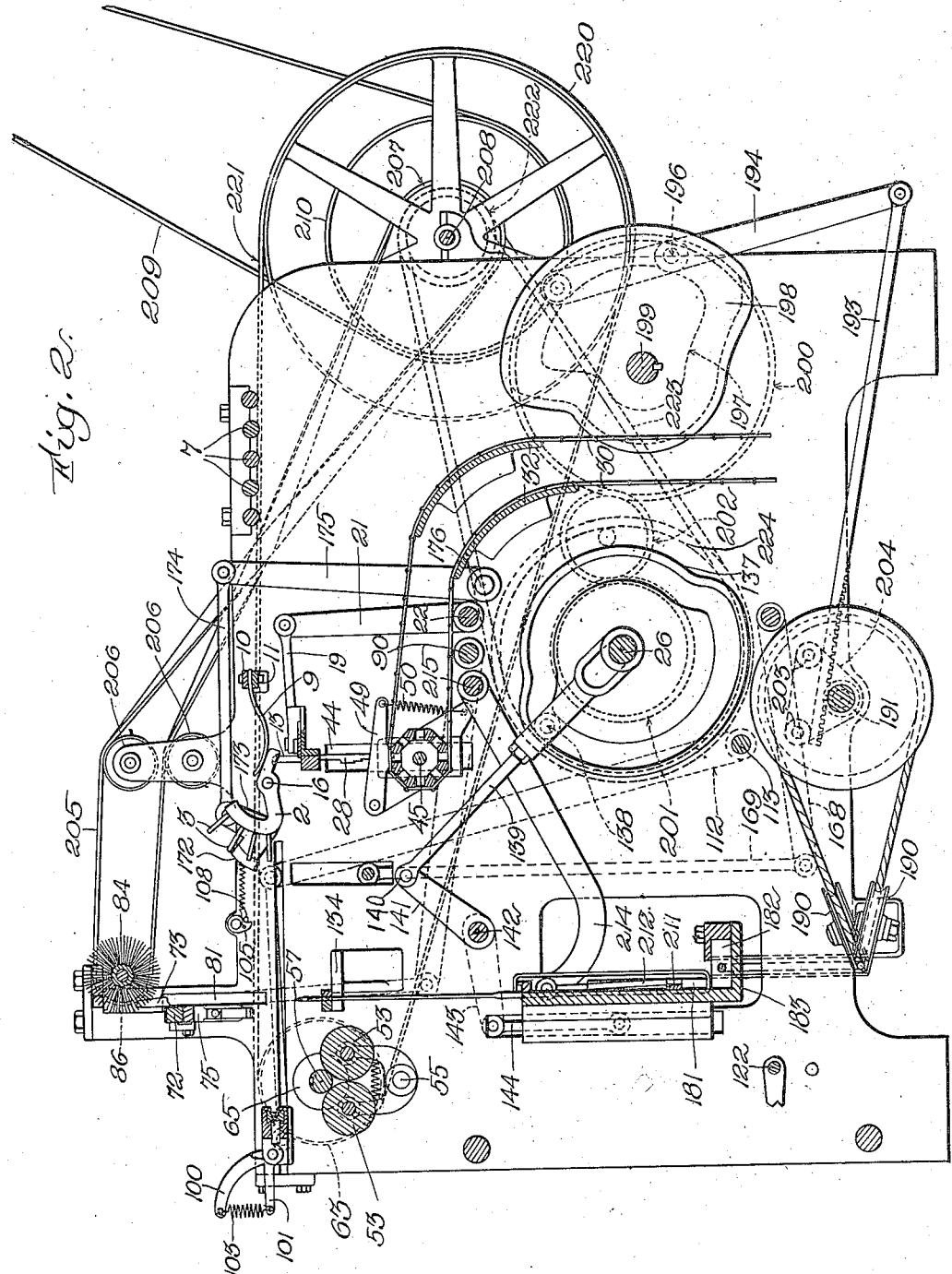
Fig. 2 is a central vertical sectional view thereof.
Figure 3:
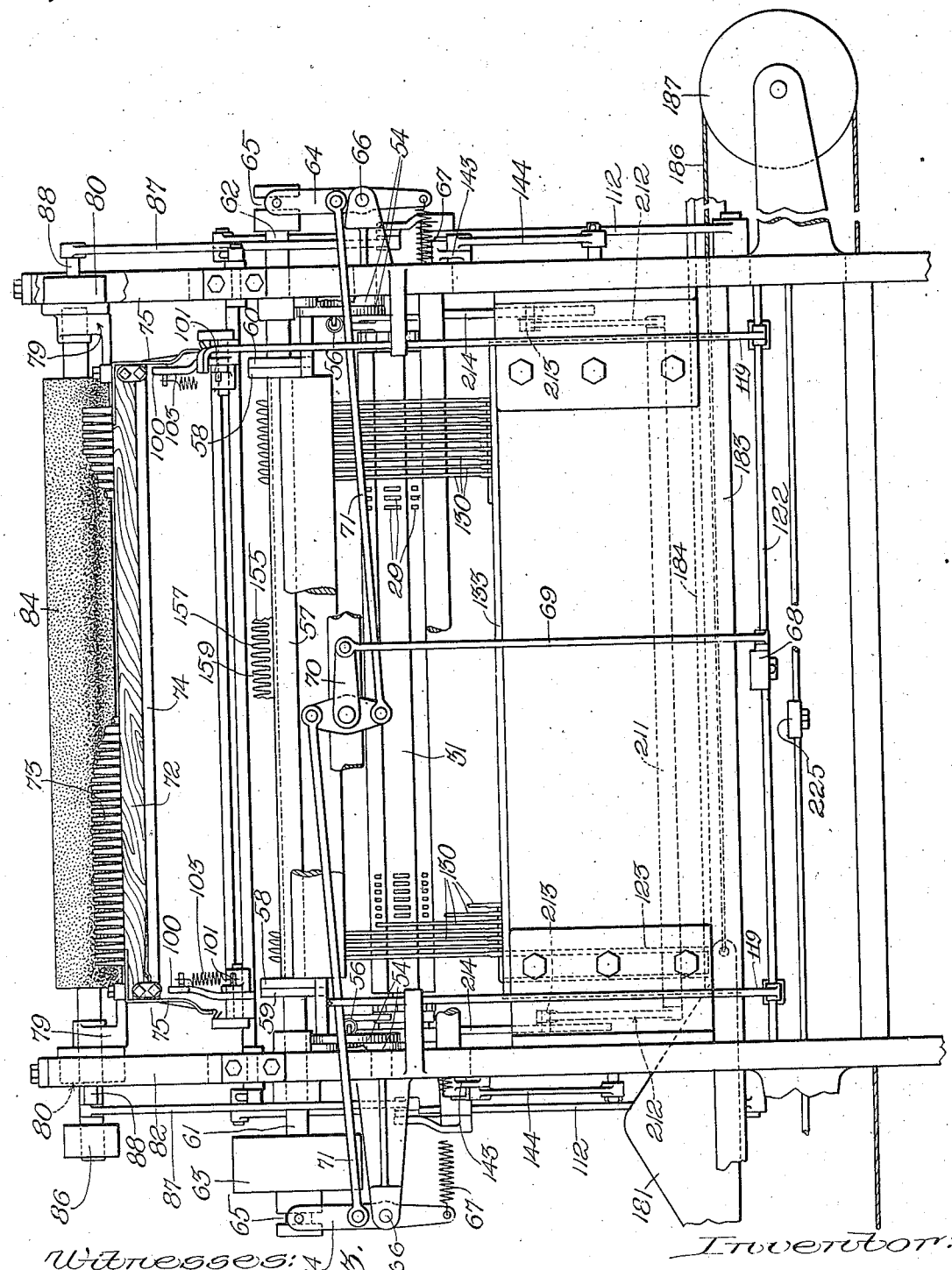
Fig. 3 is a view of the machine in front elevation.
Figure 4:
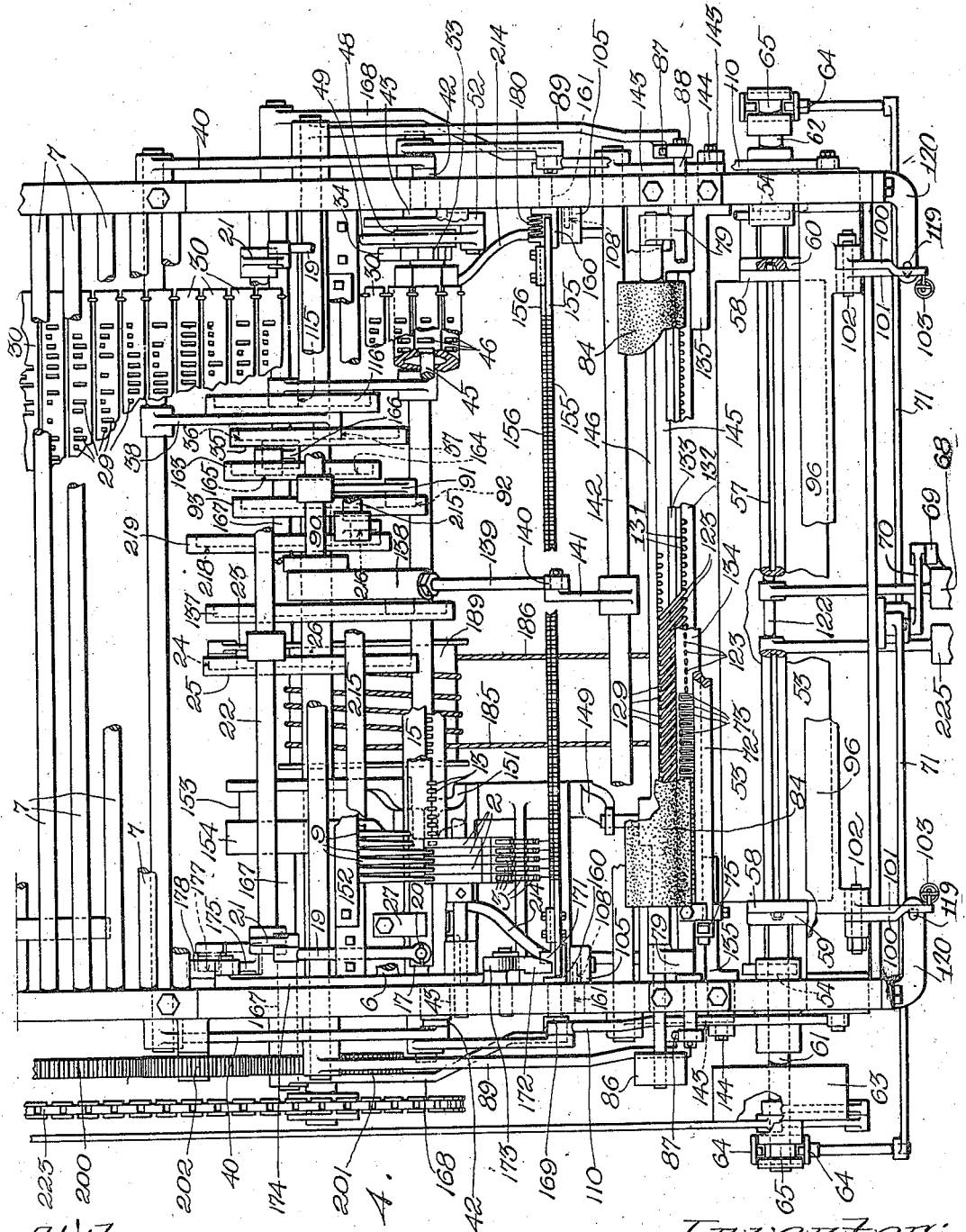
Fig. 4 is a top plan view, partly broken away.

In order to deliver the selected threads properly to the spool 57, I provide mechanism for grabbing the free projecting ends of the selected threads or yarns and drawing them forward over the spool, said mechanism as herein shown comprising two jaws 94, 95 set in bars 96, 97, the latter preferably being held relatively stationary in arms 98 slidingly mounted in guide slots 99 in the frame of the machine and provided with upwardly and forwardly extending portions 100, and the bar 96 being carried by a lever 101 pivoted at 102 to the arm 98 and normally held in closed position by a spring 103. The levers 101 are provided with rigid upwardly projecting ears or trip levers 104 to engage depending trips 105 pivoted at 106 to the frame of the machine and normally held by springs 107 against stops 108 so that when the jaws 94, 95 are moved inwardly the trip levers 104 strike said trips, thereby opening said jaws just before the jaws reach the free ends of the yarns which are to be drawn, said trips maintaining said jaws open long enough to permit said jaws to be moved forwardly into embracing position with relation to all of the ends of the selected yarns, whereupon the trip levers 104 escape from the trips 105, permitting the jaws to close instantly into gripping relation with said ends of said yarns. The trips 105 yield on the backward movement of the jaws so as not to interfere therewith in any way. The jaw members 94, 95 may consist of strips of wood, fiber, rubber, felt, or other suitable material, set into the bars 96, 97, and preferably covered with a facing 109 of comparatively soft material such as rubber so as not to cut the yarn. Also the engaging faces of the jaws are preferably offset or angularly shaped, viewed in cross section, as clearly shown in Figs. 5 and 6, so that the grip on the yarn may be positive and sufficiently strong to pull the yarn without requiring much pressure. The actuating means for this drawing or yarn-delivering mechanism is best shown in Figs. 1 and 4, comprising links 110 pivoted at 111 to the arms 98 of the gripper members and moved by arms 112 fast on a rock shaft 113 provided with an actuating lever 114 whose roll 115 travels in a path cam 116 fast on the cam shaft 26. The movements are so timed that by the time the selective mechanism has brought the required yarn ends into horizontal position opposite the gripping jaws of the drawing mechanism, the tube frame 72 has been moved up to the position shown in Fig. 5 out of the way of said drawing mechanism, whereupon the drawing mechanism moves in, grabs the projecting ends of the selected threads or yarn, as shown in Fig. 6, pulls them out toward the front of the machine over the spool, Fig. 7, and holds them there while the operator depresses the yarn and fastens them in the usual slot 117 by means of a holding wire 118, Fig. 8. The yarn is now ready to wind on the spool, and accordingly the operator depresses the foot treadle 68 in order to clamp the spool by the friction plates 59, 60 of the winding mechanism, and at the same time the grippers are released from the yarn by means of links 119 supported in guides 120 at the front of the machine and overhanging at its upper end, see Figs. 1 and 3, actuated by levers 121 projecting from a transverse rock shaft 122 rocked by the treadle 68. The operator holds his foot on the treadle, thereby continuing the winding, until the spool is wound, whereupon he removes his foot from the treadle and the winding ceases. According to the preferred embodiment of my invention, herein explained, the yarns are now sheared and put through the tubes of the tube frame. The yarn pushers 123, already referred to, are best shown in Figs. 4, 9–11, where it will be seen that they comprise slender upwardly projecting rods or fingers 123 terminating in a yarn receiving notch 124 which projects preferably obliquely upward and forward, the adjacent top edge 125 of the pusher extending upward obliquely in an opposite direction and having its point 126 deflected to one side of the vertical axis of the pusher finger. The purpose of this construction is as follows: When the pushers are about to engage the strands of yarn they stand edgewise to the yarn as shown in Fig. 9, so that the deflected point 126 enters between successive strands 4, see Fig. 12, and, as the pusher is raised, tends to separate said strands, the strand which is immediately above a pusher sliding down on the beveled edge 125 until it reaches the notch 124, which it thereupon enters as shown in Fig. 13, being preferably aided slightly in this movement by the fact that the slight raising of the pusher at this time has rendered the yarn more or less taut. As soon as the yarn is in the notch 124 the pusher is given a quarter turn to the position shown in Figs. 10 and 14 so as to extend flatwise substantially in line with the strand of yarn, thereby binding the yarn in place, as clearly illustrated in Fig. 14. At the same time the yarn is severed or sheared off at the selector, as will be presently explained. Returning now to the description of the details of the pusher mechanism, the successive pushers terminate at their lower ends in vertical loops, or rather are deflected rearwardly at 127 Fig. 11 and thence upwardly to provide a vertical portion 128 which for convenience and strength is united at 129 to the main upright portion 130 of the pusher, and the successive pushers are placed side by side as best shown in Figs. 3 and 4, for vertical movement in grooves 131 cut in the rear face of a transverse angle bar 132, in which said pushers are held by a transverse plate or bar 133, said pushers being guided adjacent their upper ends in a stationary guide bar 134. The angle bar 132 is provided at its ends with slides 135 whereby it is given a slight upward movement on guides 136 to lift the pushers to the position shown in Figs. 9, 10 and 13, by means of a path cam 137, Figs. 2 and 24, which reciprocates a cam roll yoke 138 and its rod 139 pivoted at 140 to a lever 141 fast on a rock-shaft 142 provided at its opposite ends with arms 143 which are connected by links 144 to said slides 135. The rear uprights 128 of the pushers slide in holes or grooves formed therefor between two holding bars or plates 145, 146, guided at their ends for longitudinal movement in guides 147, Fig. 17, and given a slight longitudinal movement by lever arms fast on a rock-shaft 148, one arm 149 of which engages a pin 150 on the shifting plate 146 and the other arm 151 of which has its cam roll 152 arranged to travel in a cam path 153 of a cam 154 on the cam shaft 26. Thus as the pushers are raised by the cam 137, angle bar 132 and connected parts, to the position shown in Fig. 9, they are all simultaneously given a quarter turn by the cam 154 and shifting bar 146, which swings all of their upright portions 128 from the position shown in Figs. 4, 17, to the position shown in Figs. 10, 14. This gives each yarn a bend as shown in Fig. 14, whereby each pusher is caused to grip its yarn with a sufficient bite to hold it relatively immovable when severed. Just as this movement is taking place the severing mechanism shears off all the yarns. While I wish it understood that any shearing mechanism operated at any suitable time in the progress of the work, comes within the scope of my invention in its broader aspects, it is well to point out that one great advantage of having the shearing take place as herein set forth is that thereby the ends of the yarns are all left even so that they do not have to be trimmed later before being put into the brush-loom. This eliminates the separate brushing out and trimming which has heretofore been necessary after the spooling and drawing in, and the separate machine for doing it, as well as the separate handling of each spool and its tube frame, as well as the saving of the yarn heretofore wasted in said trimming. The shearing mechanism is best shown in Figs. 3–5, 10, 15, 19. Two transverse shear plates 155, 156, the latter being preferably supported by the former as clearly shown in Figs. 5, 10 and 15, are provided with similar upwardly projecting teeth 157, 158, Fig. 19, separated by V-shaped slots 159 spaced apart to correspond to the normal separation of the strands of yarn. Said plates have flat contacting faces like a pair of shears, so that when one is moved lengthwise on the other the shearing is accomplished. These shear plates are supported at their ends in brackets 160 terminating in slides 161 for vertical movement in guide slots 162 in the frame of the machine, being raised and lowered therein by a cam 163 in whose cam path 164 travels a roll 165 of a lever 166 fast on a transverse rock shaft 167 provided at its ends with arms 168 connected by lifting links 169 to said slides 161. The shearing or relative endwise movement of the two plates is accomplished by moving the plate 156 on the plate 155. A retaining plate 170 holds the plate 156 in sliding contact with the plate 155 and said plate 156 at one end has a rearwardly projecting lug or horn 171 in position to be engaged, when the shear is in its raised position, by the cam edge 172 of a bell-crank lever 173, Fig. 23, connected by a link 174 to a cam lever 175 pivoted at 176 to the frame of the machine and having its roll 177 arranged to travel in the path 178 of a cam 179, said cam 172 moving the shear plate 156 in opposition to a spring 180 at its opposite end, see Fig. 4. Thus the yarns are all severed simultaneously when held taut by the pushers in their initial upward and quarter-rotated position. Having severed the yarns and gripped them properly by the pushers, the latter are raised, preferably one by one, so as to push the individual yarn-ends through the individual tubes of the tube frame, which was lowered to the position shown in Figs. 9 and 10 at the time that the pushers were raised as there shown. To accomplish this movement, a lifter or slide cam 181 is provided, see Figs. 1, 2, 3, 11, 20, whose base 182 slides on the bottom extension 183 of the angle bar 132, the track therefor being completed by an overhanging angle iron 184, said lifter 181 being actuated by a cable or cables 185, 186 passing over end guide pulleys 187 and secured at their meeting ends at 188 to a drum 189, to which they are directed by directing wheels or pulleys 190, said drum being provided with a toothed pinion 191 engaged by the rack end 192 of a bar 193 moved longitudinally by a lever 194 pivoted at 195 to the frame of the machine and having a cam roll 196 arranged to travel in the path 197 of a cam 198 fast on a shaft 199 driven by a gear 200 from the main cam shaft 26 by a driving gear 201 and intermediate gear 202. The rack bar 193 is retained in engagement with its pinion 191 by rolls 203 carried by plates 204 swiveled on the drum shaft. Thus as the lifter 181 moves from side to side of the machine it projects the pushers successively as best shown in Fig. 20 to their fully raised position shown in Fig. 11. As the pushers go up, the strands of yarn are gradually pulled out therefrom, and the extent of upward movement of the pushers is greater than the length of the free end of the yarn, the object being to strip the yarn end from each pusher while the pusher is still in its upward movement, when said freed yarn end is instantly caught by a brush or other deflecting means 84 and bent over the end of its tube, whereby it is held in perfectly threaded position while the pusher is descending or being drawn back out of the tube. My object in providing means for accomplishing this movement and operation separately for each pusher and its strand of yarn is to insure a perfection of result which would not otherwise be practicable. It is necessary that each pusher shall retain the yarn with a sufficient frictional grip to prevent the possibility of its becoming accidentally displaced from the pusher before reaching fully threaded position, and yet, according to this preferred form of my invention, it is desirable that the yarn shall slide in its pusher so as to gradually pull out from the notch 124 thereof before the pusher has ceased its upward movement, and accordingly, by raising the pushers one by one or dissimultaneously, the yarn carried by each pusher meets separately the resistance of the wound spool 57, with the result that, although the yarn is held taut, there is not sufficient strain to tend to rotate the spool, but said single strand of yarn is gradually pulled lengthwise out of the notch of the pusher by the dead resistance of the spool 57 as the pusher moves up. This also insures that the ends, which were previously sheared all even, will all remain even beyond the tubes. Simply by operating the pushers successively as shown in Fig. 20, the foregoing advantages are secured, besides being able to use exceedingly slender and frail pushers, as each has merely to withstand the resistance of its own strand of yarn, the yarns are prevented from getting out of even length, the threading resistance offered to the tube frame is reduced to a minimum, as only one, or at least a few, tubes can be engaged at a time, and the threading operation is accomplished quickly with very little friction and power. The brush 84 is rotated by a belt 205 passing over guide pulleys 206 and actuated by a pulley 207 on the main driving shaft 208, which derives its power from a belt 209 and pulley 210 driven from a counter shaft or any other source of power. To prevent any pusher from accidentally remaining up in its tube after the threading of the tube frame, I preferably provide a safety bar 211 (see Figs. 1, 2, 11, 16, 17) extending transversely of the machine through all the lower loop ends of the pushers, being suspended and operated at its opposite ends by arms 212 pivoted at 213 to arms 214 fast on a rock shaft 215 operated by a lever 216 whose roll 217 travels in the path 218 of a path cam 219, so shaped and timed that said safety bar is raised to the position shown in Fig. 11 just before the pushers are to be raised, and is lowered just after the lifter 181 has completed the lifting of all the pushers and is moved to one side of the machine. The driving shaft 208 also carries a large winding pulley 220 from which a belt 221 passes to the pulley 63. Also said driving shaft is provided with a sprocket 222 for operating a sprocket chain 223 and sprocket wheel 224 which drives the cam shaft 26, the operation of said sprocket 222 and its sprocket chain and hence of the cam shaft and connected parts, being under the control of the operator through a treadle 225 pivoted at 226 and connected by a link 227 to a bell-crank 228 which operates a rod 229 to one end of a bell-crank 230 pivoted at 231 and whose other end constitutes a shipping fork 232 for any well-known kind of a clutch 233.

In use, the operator simply places a usual Axminster loom spool 57 and usual tube frame 72 in my machine, the spool 57 being placed on the presser rolls 53 with its flanges 58 overhanging the opposite ends of said presser rolls as shown in Figs. 4 and 5, and the tube frame being placed on its carrier or support 74 with its end brackets overhanging the ends of said support whereby it is accurately positioned lengthwise, being locked in place by the turn-buttons 76, 77. Having thus placed the spool and tube frame, the operator depresses the treadle 225, which starts the cam shaft 26 rotating. First, the tube frame moves up out of the way of the yarn-drawing mechanism, and the pattern cylinder 31 is moved up by the mechanism, Fig. 18, so as to operate the individual yarn holder frames 2 to bring those particular holders 3 thereof into horizontal position which carry the individual yarns that are to be wound onto the spool, said holder frames being locked immovably in this selected position by the mechanism shown in Figs. 6 and 22. Meanwhile, the drawing mechanism has been moving forward, and its gripper jaws 94, 95 now open under the tripping action of the trip 105 and close over and down upon the row of thread-ends 5 which project from the holders 3 which have been selected and brought into horizontal position. Said jaws, with their complement of yarns, extending through the width of the machine, are then moved back to the position shown in Fig. 7 by the mechanism 110—116, best shown in Fig. 1, the pattern cylinder meanwhile being lowered and rotated forward one step to bring the next card of the pattern chain into controlling position for the next spool. The operator then shifts his foot from the treadle 225 which causes the cam shaft to halt, having completed part only of its rotation, to the treadle 68, meanwhile securing the yarns by the wire 118 as shown in Fig. 8, and as the treadle 68 is depressed to its bottom position, it clamps the ends of the spool with the winding disks 59, 60 of the winding mechanism, and simultaneously releases the ends of the yarns from between the jaws 94, 95. As soon as the spool has been wound with the desired length of yarns, the operator shifts his foot back from the treadle 68 to the treadle 225, thereby releasing the spool from the winding mechanism and at the same time lifting the pushers 123 to the position shown in Figs. 9 and 13 by means of the raising of their carrying bar 132 by the mechanism shown in Fig. 24. At the same time the tube frame 72 is being lowered and the safety bar 211 is being raised, and also the severing device is being raised. As the successive strands of yarn are engaged by the notches 124 of the pushers 123, all the pushers are given a quarter turn by the mechanism shown in Fig. 17, thereby frictionally locking the individual strands of yarn in the individual pushers (see Fig. 14), and at the same time the severing device embraces all of said strands of yarn which then rest in the notches 159 thereof immediately in front of the horizontally extending holders 3, and the longitudinally movable shear 156 is given a shearing movement by the mechanism shown in Figs. 19 and 23, which shears off with absolute uniformity all the strands of yarn at the required distance from the line of horizontal holders which hold the supply end of the yarns and from the engaging ends of the pushers which thereafter carry the severed ends of said yarns. Just as the yarns are severed, the lifting cam 181 starts forward and lifts each pusher in succession, as shown in Figs. 11–20, being operated by the mechanism shown in said figures and in Figs. 1–3, thereby causing each pusher in turn to push the free severed end of the strand of yarn which it carries upward through the individual tube provided for said strand, said strand being held back by the resistance of the wound spool 57, so that the yarn slips from the pusher as the latter moves, said pusher continuing its movement upward after the escape of the yarn, and the yarn being instantly shifted away from the pusher and deflected over the edge of its tube by the constantly rotating brush 84. The movement of the pusher 123 and the coöperation of the spool 57 tends to maintain the strand of yarn taut, and the brush 84 still further insures and maintains this taut condition of the strands after it slips from the pusher, said brush further facilitating the removal of the yarn-end from the pusher, as well as performing its primary function of bending the yarn over the edge of the tube sufficiently to prevent the yarn from being pulled backward by the pusher when the latter retreats from the tube. Preferably the brush 84 rotates continuously and its direction of rotation at the tube is upward and away from said tube, so that as long as the tube frame is in the machine there is no possibility of the strands of yarn getting out of the tubes. The operator then unsnaps the holding buttons from the tube frame and places the tube frame in its proper operative position on the spool 57, both being then removed together from the machine ready for use in the loom without further attention. The machine is now ready for another spool and tube frame. The complete finishing of a spool and tube frame, including the selecting of the different colors of yarns, winding them on the spool, threading them through the tubes of the tube frame, and leaving them in accurately evened and sheared position, takes place rapidly, all the parts being simple, compact, and so timed that one operator can attend to a large number of spools and tube frames per day. I consider as of practical value the idea of delivering the threads through the tubes by means of mechanism operating at the rear or spool ends of the tubes. These ends are larger than the free projecting ends of the tubes, and, moreover, are soldered against each other so that the tubes mutually support and strengthen each other at their large ends, whereas the smaller free ends are unsupported, and, being made of thin tin, are frail and liable to get injured easily. Hence I consider it of practical importance to avoid entering the small end of the tube with any sort of pulling device, such as a needle or the like. While various other forms of mechanism for delivering the thread through the tube by an impulse from the rear may be employed within my broad idea of means as herein set forth, I prefer a definite, positive pushing device which simply makes a loop in the yarn by doubling the yarn back on itself over the end of the pusher and then pushes said loop through the tube until the yarn has straightened out and escapes from the pusher when in fully threaded position. The tension device 7 tends to hold the yarns against accidental backward movement when severed, and the upward turning of the holder frames 2, whereby the yarns are bent as shown in Fig. 5, also tends to hold them in place. The holders 3 are also preferably long and small so as to constitute a friction retarding means for holding the yarn-end exactly as it is left by the shearing mechanism. A great saving of yarn also is effected, as well as promoting even tension, by laying the yarn-ends on the spool mechanically, and preferably so that they are all spaced properly parallel and maintained under proper tension directly on the spool at and from the very beginning of the winding, as distinguished from the method of placing the yarns on the spool by hand, heretofore followed even in machine winding. In other words, my automatic mechanism delivers the yarn to the spool without waste, the ends all being necessarily even and properly alined, and at the end of the winding my automatic severing mechanism likewise prevents waste, taking the place both of the ordinary hand cutting of the yarns and the shearing which has hitherto been considered necessary after the threading of the yarns through the tubes of the tube frame. Each yarn-holder frame 2 carries a full complement of colors, so that, when controlled and actuated by the pattern mechanism, all the varieties of selections are easily and instantly made for the entire carpet, the selecting mechanism being operated for one selection at a time and then locked while the given spool and tube for that selection are being wound and threaded, and then operated for another selection for a second spool and tube, and then locked while said second spool and tube are being wound and threaded, and so on for all the spools and tubes required for the entire pattern of the carpet. In other words, the machine provides means for automatically selecting all the different yarns required for the successive spools, delivering each selection to the spool provided for said selected set of yarns, winding said spool with said yarns while held in absolutely unvarying, correct position with relation to each other, severing said yarns evenly while under uniform tension and still in correct position with relation to each other and to the spool, and delivering the free ends of the yarns through the tubes of the tube frame in uniform position, all of said successive movements following each other rapidly and automatically without requiring any skill on the part of the operator. I believe that I am the first to invent a machine for accomplishing the complete object above described, as well as various portions thereof taken separately, and accordingly in the appended claims I have claimed broadly the complete combination as well as sub-combinations, and wish it understood that the invention is not to be restricted to any of the specific mechanism herein set forth as preferred except where so stated in certain of the claims. Also I wish it understood that I am not limited to my preferred order or succession of the operations except where expressly so stated in certain of the claims. For a full understanding of the breadth above referred to, the mechanisms of my co-pending applications are to be considered along with the mechanism of this case, viz, Serial No. 556,129, filed April 18, 1910, and Serial No. 546,325, filed February 28, 1910, the present application containing certain claims generic to all three cases.

Having described my invention, what I claim as new, and desire to secure by Letters Patent is:

1. In a machine of the kind described, means for holding a loom tube frame in position to be threaded, means for pushing the yarns through the tubes of said frame from the rear or spool end of the tubes toward the oposite ends of the tubes, and means for engaging the yarn ends beyond said opposite tube ends and stripping them into holding position while the pushers are retracted.

2. In a machine of the kind described, means for holding a loom tube frame in vertical position to be threaded, means for pushing the yarns vertically through the tubes of said frame from the rear or spool ends of the tubes toward the opposite ends of the tubes, and means for engaging the yarn ends beyond said opposite tube ends and stripping them into holding position while the pushers are retracted.

3. In a machine of the kind described, means for holding a loom tube frame in position to be threaded, means for pushing the yarns through the tubes of said frame from the rear or spool ends of the tubes toward the opposite ends of the tubes, and means for simultaneously engaging and holding the free projecting ends of the yarns while the pushers are being retracted.

4. In a machine of the kind described, means for holding a loom tube frame in position to be threaded, a series of needles for threading the tubes, and means for simultaneously moving a plurality of needles with a progressive threading movement for threading the tubes.

5. In a machine of the kind described, means for holding a loom tube frame in position to be threaded, a series of needles for threading the tubes, and means for actuating said needles including an actuating member movable transversely of the needles for simultaneously actuating a plurality of the needles with a progressive movement for the threading operation.

6. In a machine of the kind described, yarn drawing mechanism to push a complement of yarns through the tubes of each tube frame from the rear or spool end of the tube toward the opposite end as successive tube frames are put in position, said drawing mechanism including means for carrying at its forward end the yarn as said end moves forward initially to enter the tube at said rear or spool end of the tube, and separate means independent of the spool to hold the free ends of the yarns after the yarn ends have been drawn through the tubes.

7. In a machine of the kind described, yarn drawing mechanism to push a complement of yarns through the tubes of each tube frame from the rear or spool end of the tube toward the opposite end as successive tube frames are put in position, including means carrying at its forward end the yarn as said end moves forward to enter the tube at said rear or spool end of the tube, and means to comb and clamp the free ends of the yarns while the pushing mechanism is being withdrawn from the tubes.

8. In a machine of the kind described, yarn drawing mechanism to push a complement of yarns through the tubes of each tube frame from the rear or spool end of the tube toward the opposite end as successive tube frames are put in position, including means carrying at its forward end the yarn as said end moves forward initially to enter the tube at said rear or spool end of the tube, and means separate from and independent of the pushing mechanism for positioning and maintaining the supply yarns in correct position for delivery to the successive tube frames.

9. A machine of the kind described, comprising means to thread the tubes of a loom tube frame with a complement of individual yarns, yarn-selecting mechanism for selecting the particular yarns to form said complement of yarns to be threaded through the tubes of said tube frame, and spool winding means.

10. A machine of the kind described, comprising means for providing a general supply of yarns, means for holding a plurality of complements of said yarns in position to be engaged, winding mechanism, means for selecting any complement desired for winding, and means for threading said selected yarns through the tubes of a loom tube frame.

11. In a machine of the kind described, means to thread the tubes of a loom tube frame with a complement of individual yarns, including a threading device for embracing each thread, and operating means for said threading device including means for turning it to bind thread therein.

12. In a machine of the kind described, means for supporting a loom tube frame in position to be threaded, and means to thread its tubes with a complement of individual yarns, including a placing device for embracing the yarn and moving the yarn through the tube frame, and means for turning said device with relation to the yarn for securing a better frictional grip on the yarn for the placing operation.

13. In a machine of the kind described, means for supporting a loom tube frame in position to be threaded, and means to thread its tubes with a complement of individual yarns, including a notched placing device for embracing the yarn and moving the yarn through the tube frame, and means for turning said device with relation to the yarn for securing a better frictional grip on the yarn for the placing operation.

14. A machine of the kind described comprising means for threading through the tubes of a loom tube frame a complement of yarns wound on a spool, and means coöperatively related to the threading means to cut even the ends of said wound on yarns before they are threaded through the tubes.

15. A machine of the kind described comprising means for taking yarns from a source of yarn supply, means to cut even said yarns before they are threaded through the tubes of a tube frame, and means coöperatively related thereto for thereafter taking the evened ends severed from said supply and threading them through the tubes of a loom tube frame.

16. A machine of the kind described, comprising means for threading a complement of yarns through the tubes of a loom tube frame, means to cut even said yarns before they are threaded through said tubes, and means for positioning the projecting ends of the threads after being threaded through said tubes.

17. A machine of the kind described, comprising means to thread a complement of yarns through the tubes of a loom tube frame, and means for engaging the free ends of the threads at the ends of the tubes and positioning them in uniformly deflected position with reference to the ends of the tubes sufficient to maintain their relation and position lengthwise of the tubes.

18. In a machine of the kind described, means for holding a loom tube frame in position to be threaded, threading mechanism for placing the yarns in the tubes with their ends projecting freely from the small ends of the tubes, and separate means for engaging and positioning said projecting ends of the yarns with relation to said small ends of the tubes so as to maintain their lengthwise place and resist any withdrawing tendency.

19. A machine for acting on tuft yarns used in carpet manufacture having winding mechanism for winding a complement of yarns on a spool, and coöperatively related mechanisms for selecting said complement of different yarns from a larger number and for placing the selected yarns through the tubes of a tube frame.

20. A machine for acting upon tuft yarns used in carpet manufacture comprising winding means for winding a complement of yarns on a spool, and coöperatively related mechanisms to select said complement of different yarns from a larger number, to thread the selected yarns through the tubes of a tube frame and for severing the yarns when the desired amount has been wound on said spool.

21. A machine of the kind described, comprising means to wind a spool with a complement of yarns, yarn-selecting mechanism for selecting said complement of yarns, including pattern-controlling mechanism, and means for threading said selected yarns through the tubes of a tube frame.

22. A machine of the kind described, comprising means to wind a spool with a complement of yarns, yarn-selecting mechanism for selecting said complement of yarns, including pattern-controlling mechanism, means for threading said selected yarns through the tubes of a tube frame, and means for severing said selected yarns.

23. A machine of the kind described, comprising means to wind a spool with a complement of yarns, yarn-selecting mechanism for selecting said complement of yarns, including pattern-controlling mechanism, means for threading said selected yarns through the tubes of a tube frame, and means for cutting off even the yarns in proper relation to said tubes and spool.

24. A machine of the kind described, comprising means to wind a spool with a complement of yarns, yarn-selecting mechanism for selecting said complement of yarns, including pattern-controlling mechanism, means for threading said selected yarns through the tubes of a tube frame, and means for severing said selected yarns after the winding and before the threading.

25. A machine of the kind described, comprising means for winding a complement of yarns side by side on a spool, automatic means for engaging a series of yarn ends and laying the same on the spool mechanically and with uniform tension, automatic severing means for severing the wound yarns from the yarn supply at a predetermined length from the spool as required by the position of the tube frame, and automatic threading means for then placing the yarn ends through the tubes of the tube frame.

26. A machine of the kind described, comprising winding mechanism for winding a spool with a complement of yarns side by side, means for holding said complement of yarns with the ends thereof projecting in position to be engaged, and mechanism for delivering the yarns to the spool in position to be wound, said last mentioned mechanism including automatically actuated yarn-end engaging means for opening automatically when moved by said delivering mechanism approximately into yarn-receiving position with relation to said holding means and for thereupon closing automatically upon the yarn-ends, and having engaging surfaces which are gentle and mild as compared with metal to grab said projecting ends without crushing the yarns.

27. In a machine of the kind described, means for holding a loom tube frame in position to be threaded, and yarn-delivering means normally outside of the tubes for first engaging the yarns while said means is entirely outside of the tube, and then entering the large ends of the tubes for delivering the yarns thence through the tubes.

28. In a machine of the kind described, means for holding a loom tube frame in position to be threaded, and threading mechanism, including solid devices arranged to double the yarns back on themselves over the ends of the same while the devices are outside of the tubes and before entering the latter, and means for then moving said devices and yarns through the tubes from the rear or spool end of the tubes.

29. In a machine of the kind described, means for holding a loom tube frame in position to be threaded, a pusher for pushing the yarn ahead of it through the tube from the rear or spool end thereof, said pusher having a notch in its end for holding the yarn at the end of the pusher, means causing the yarn to slip through said notch as the pusher moves forward until the yarn-end escapes from the pusher beyond the forward end of the tube, and deflecting means for then deflecting the outer end of the yarn over the edge of said forward end of the tube.

30. In a machine of the kind described, means for holding a loom tube frame in position to be threaded, a pusher for pushing the yarn ahead of it through the tube from the rear or spool end thereof, said pusher having a notch in its end for holding the yarn at the end of the pusher, and means for rocking said pusher axially to bind said yarn frictionally in said notch.

31. In a machine of the kind described, means for holding a loom tube frame in position to be threaded, and a pusher for pushing the yarn ahead of it through the tube from the rear or spool end thereof, said pusher having a diagonally beveled end provided adjacent its rear portion with a notch for receiving the yarn as the yarn slides down along said beveled end.

32. In a machine of the kind described, means for holding a loom tube frame in position to be threaded, and threading mechanism, including a series of pushers spaced apart to correspond to the threads and tubes, said pushers having offset forwardly projecting ends and each having means to engage a thread, said pushers standing transversely of said threads with said offset projecting ends between adjacent threads before engaging said threads, and mechanism for engaging said pushers with said threads, including means to rotate said pushers whereby said projecting offset ends tend to separate the threads and aid said engaging portion.

33. In a machine of the kind described, means for holding a loom tube frame in position to be threaded, and threading mechanism, including a threading device mounted for axial and longitudinal movement, having a laterally extending portion back of its thread-receiving end, and operating mechanism for said device, including means to engage and move laterally said projecting portion.

34. In a machine of the kind described, means for holding a loom tube frame in position to be threaded, and threading mechanism, including a series of threading devices mounted for axial and longitudinal movement, all of said devices having laterally extending portions, and operating mechanism for said devices including a transverse member engaging all of said laterally extending portions to move the same laterally simultaneously, and means for dissimultaneously moving said threading devices longitudinally.

35. In a machine of the kind described, means for holding a loom tube frame in position to be threaded, and threading mechanism, including a series of threading devices, means to move simultaneously said devices longitudinally into engagement with the yarns to be threaded through the tubes, and means thereafter to move said devices dissimultaneously to thread the tubes one by one.

36. In a machine of the kind described, means for holding a loom tube frame in position to be threaded, and threading mechanism, including a series of threading devices, means to move said devices dissimultaneously lengthwise to thread the tubes one by one, and means operating at the end of the threading movement to retract said threading devices.

37. In a machine of the kind described, means for holding a loom tube frame in position to be threaded, and threading mechanism including a series of threading devices, a transverse bar containing bearings in which said devices are mounted to move longitudinally, a sliding cam to engage said devices successively for moving them dissimultaneously for the threading operation, and a track for said cam to slide upon.

38. In a machine of the kind described, means for holding a loom tube frame in position to be threaded, and threading mechanism, including a series of threading devices, a transverse bar containing bearings in which said devices are mounted to move longitudinally and axially, means to rock said devices axially in said bearings, a sliding cam to engage said devices successively for moving them longitudinally dissimultaneously for the threading operation.

39. In a machine of the kind described, means for holding a loom tube frame in position to be threaded, threading mechanism for placing the yarns in the tubes, and brushing means for deflecting the free ends of said yarns away from the threading mechanism.

40. In a machine of the kind described, means for holding a loom tube frame in position to be threaded, threading mechanism for placing the yarns in the tubes, and means having a movement away from said tubes for engaging and pulling taut the free ends of the yarns when disengaged from the threading mechanism.

41. In a machine of the kind described, means for holding a loom tube frame in position to be threaded, threading mechanism for placing the yarns in the tubes, and a brush movable into deflecting engagement with the free ends of the yarns beyond the tubes.

42. In a machine of the kind described, means for holding a loom tube frame in position to be threaded, threading mechanism for placing the yarns in the tubes, and a rotary brush for deflecting the free ends of the yarns away from the threading mechanism.

43. In a machine of the kind described, means for holding a loom tube frame in position to be threaded, threading mechanism for placing the yarns in the tubes, a rotary brush having its brush portion extending transversely across the small ends of the tubes, and means for rotating said brush in a peripheral direction away from the tubes at said small ends thereof.

44. In a machine of the kind described, means for taking yarns from a source of yarn supply, means to hold said yarns in position to be engaged, comprising a series of separately movable parts set close together and each containing provision for holding in predetermined position a series of different yarns, means for moving said independently movable parts so as to bring any one of the said series of yarns of each of said respective movable parts into position to be engaged, and yarn-threading means for threading said yarns through the tubes of a tube frame.

45. In a machine for acting upon tuft yarns for use in carpet manufacture, the combination with means for winding a complement of yarns on a spool, means to hold the main supply of yarns in position to be engaged, and coöperatively related mechanisms including a series of separately movable parts set close together and each containing provision for holding in predetermined position a series of different arms, means for moving said independently movable parts so as to bring any one of said series of arms of each of said respective movable parts in position to be engaged, and including also coöperatively arranged yarn-threading means for threading yarns through the tubes of a tube frame.

46. In a machine of the kind described, means for taking yarns from a source of yarn supply, means to hold said yarns in position to be engaged, comprising a series of independently pivoted parts, each containing provision for holding in predetermined separate position a series of different yarns, means for moving said pivoted parts so as to bring any one of said different yarns of each of said series of yarns into position to be engaged, and yarn-threading means for threading said yarns through the tubes of a tube frame.

47. In a machine of the kind described the combination with spool-winding means for winding yarns on a spool from a source of yarn supply and coöperatively related mechanisms for selecting a complement of different yarns from a larger number in said supply and for placing the selected yarns through the tubes of a tube frame, said mechanisms including a series of independently pivoted parts each containing provision for holding in predetermined separate position a series of different yarns, means for moving said pivoted parts so as to bring any one of said series of each of said yarns into position to be engaged, and yarn threading means.

48. In a machine of the kind described, means to hold a series of yarns in predetermined parallel arrangement, yarn-threading means for threading the yarns through the tubes of a tube frame, and automatic shearing mechanism for cutting off said yarns, having a series of laterally projecting cutting members to receive the yarns between them, a coöperating series of laterally projecting cutting members, and means for relatively moving one of said series of cutting members laterally of the other series to shear off the threads.

49. In a machine of the kind described, means to hold a series of yarns in predetermined parallel arrangement, spool-winding means for winding said threads on a spool, and automatic shearing mechanism for cutting off said yarns, having a series of laterally projecting cutting members to receive the yarns between them, a coöperating series of laterally projecting cutting members, and means for relatively moving one of said series of cutting members laterally of the other series to shear off the threads.

50. In a machine of the kind described, means to hold a series of yarns in predetermined parallel arrangement, yarn-threading means for threading the yarns through the tubes of a tube frame, spool-winding means for winding said threads on a spool, and automatic shearing mechanism for cutting off said yarns, having a series of laterally projecting cutting members to receive the yarns between them, a coöperating series of laterally projecting cutting members, and means for relatively moving one of said series of cutting members laterally of the other series to shear off the threads.

51. In a machine of the kind described, yarn-threading mechanism to thread a series of yarns through the tubes of a tube frame, and automatic shearing mechanism to even the yarns, comprising two transversely extending members each provided with laterally projecting cutting teeth separated by slots corresponding in position to the yarns to be cut, and means for relatively moving said cutting teeth transversely of said yarns for simultaneously cutting all of the yarns.

52. In a machine of the kind described, yarn-threading mechanism to thread a series of yarns through the tubes of a tube frame, and automatic shearing mechanism to even the yarns, comprising two transversely extending members each provided with laterally projecting cutting teeth separated by slots corresponding in position to the yarns to be cut, and a cam movable transversely of said members in engagement with one of the members for moving it lengthwise of the other member to slide its cutting teeth past the cutting teeth of the other member for simultaneously shearing said yarns.

53. In a machine of the kind described, yarn-threading mechanism to thread a series of yarns through the tubes of a tube frame, and automatic shearing mechanism to even the yarns, comprising two transversely extending members each provided with laterally projecting cutting teeth separated by slots corresponding in position to the yarns to be cut, a cam movable transversely of said members in engagement with one of the members for moving it lengthwise of the other member to slide its cutting teeth past the cutting teeth of the other member for simultaneously shearing said yarns, and a spring in opposition to said cam for returning said moved member.

54. In a machine of the kind described, yarn-winding mechanism for winding a series of yarns side by side on a spool, and automatic shearing mechanism to even the yarns, comprising two transversely extending members each provided with laterally projecting cutting teeth separated by slots corresponding in position to the yarns to be cut, and means for relatively moving said cutting teeth transversely of said yarns for simultaneously cutting all of the yarns.

55. In a machine of the kind described, yarn-winding mechanism for winding a series of yarns side by side on a spool, and automatic shearing mechanism to even the yarns, comprising two transversely extending members each provided with laterally projecting cutting teeth separated by slots corresponding in position to the yarns to be cut, and a cam movable transversely of said members in engagement with one of the members for moving it lengthwise of the other member to slide its cutting teeth past the cutting teeth of the other member for simultaneously shearing said yarns.

56. In a machine of the kind described, yarn-winding mechanism for winding a series of yarns side by side on a spool, and automatic shearing mechanism to even the yarns, comprising two transversely extending members each provided with laterally projecting cutting teeth separated by slots corresponding in position to the yarns to be cut, a cam movable transversely of said members in engagement with one of the members for moving it lengthwise of the other member to slide its cutting teeth past the cutting teeth of the other member for simultaneously shearing said yarns, and a spring in opposition to said cam for returning said moved member.

57. A machine of the kind described comprising a source of yarn supply, winding mechanism for winding yarns from said supply on a spool, means to cut even said yarns between the supply and the spool after being wound on the latter, and means to take the evened ends of the wound on yarns and place the same through the tubes of a tube frame.

58. A machine for acting on tuft yarns in carpet manufacture having means for taking yarns from a source of yarn supply, means to cut the yarns from said supply before they are threaded through the tubes of a tube frame, and one or more pushers for thereafter taking an end severed from said supply and carrying the same through a tube from the end through which the pusher initially enters.

59. A machine for acting upon tuft yarns in carpet manufacture having devices for holding the yarns separated, yarn threading means, means for holding a tube frame in relation to the yarns to be threaded therethrough, severing devices for severing the yarns, and means for actuating said threading devices to cause the same to engage the yarns prior to severance and to carry the yarns after severance into and through the tubes of the tube frame.

60. A machine for acting upon tuft yarns in carpet manufacture having devices for holding the yarns separated, yarn threading means, means for holding a tube frame in relation to the yarns to be threaded therethrough, severing devices for severing the yarns, and means for actuating said threading devices to cause the same to engage the yarns prior to a severance at the rear side of the tubes and to carry the yarns after severance into and through the tubes of the tube frame initially through the rear or large ends of the tubes.

61. In a machine for acting upon tuft yarns in carpet manufacture, the combination with means to hold a supply of yarns separated, means to wind the yarns on a spool, mechanism to sever the wound on yarns from the supply, and means to engage the severed wound on ends and place them through the tubes of the tube frame.

62. A machine for acting upon tuft yarns for use in carpet manufacture comprising winding mechanism for winding a complement of yarns on a spool, and coöperatively related mechanisms for selecting said complement of yarns from a larger number and for placing the selected yarns through the tubes of a tube frame after the said yarns have been wound on said spool.

63. In a machine for acting upon tuft yarns in carpet manufacture, the combination with means to hold a series of said yarns, means to support a tube frame in relation to the yarns to be threaded therethrough, a series of pushers with means to cause relative movement between the same and the tubes of the tube frame, first to position the pushers through the large ends of the tubes and through the tubes, and then to position them without the tubes, said pushers on the first of said positioning movements engaging the separated yarns and carrying them into the large end of the tubes and through the tubes.

64. In a machine for acting upon tuft yarns in carpet manufacture, the combination with means to hold a series of said yarns, means to support a tube frame in relation to the yarns to be threaded therethrough, a series of pushers with means to cause relative movement between the same and the tubes of the tube frame; first to position the pushers through the large ends of the tubes and through the tubes, and then to position them without the same, said pushers engaging the separated yarns and carrying them into the large end of the tubes and through the tubes on the first of said positioning movements, and means at the small ends of the tubes for stripping the yarns from said pushers after the yarns have been carried through the tubes.

65. In a machine for acting upon tuft yarns in carpet manufacture, the combination with means to hold a series of such yarns, means to support a tube frame in relation to the yarns to be threaded therethrough, a series of pushers with means to cause relative movement between the same and the tubes first to enter the pushers through the large ends of the tubes and through the tubes and then to position them without the same, said pushers engaging the yarns prior to entering the large ends of the tubes, and means to cause relative lateral movement between the pushers and the yarns to insure better engagement between the same, said yarns being carried into the large end of the tubes on the first of said positioning movements.

66. In a machine of the kind described, means for holding a loom tube frame in position to be threaded, means for holding yarns adjacent the large ends of the tubes, and yarn delivering means movable initially through the tubes from the large toward the small ends thereof, said delivering means engaging and carrying the yarns through the tubes on their initial movement.

67. In a machine for acting upon tuft yarns in carpet manufacture, the combination with means for holding a tube frame with relation to a series of yarns to be threaded therethrough, a plurality of yarn tubing devices and means for causing relative movement between the tubing devices and the tubes first to position the devices through their respective tubes, and thence to position the same without the tubes, said devices being adapted to engage the yarns at the large or rear ends of the tubes and carry them within the said large ends and through the tubes on the first of said positioning movements.

68. In a machine of the kind described, tubing mechanism to thread the tubes of a tube frame with a complement of individual yarns, and yarn selecting mechanism for selecting the particular yarns to be threaded through the tubes of said tube frame.

69. In a machine of the kind described, means for providing a general supply of yarn, means for selecting and holding a complement of said yarns in position to be engaged, and tubing means for threading said yarns through the tubes of a loom tube frame.

70. In a machine of the kind described, means for holding a loom tube frame in position to be threaded, yarn delivering means mounted at the rear or large end of the tubes, and operating mechanism at the large end of the tubes connected with said yarn delivering means for engaging the latter with the yarns and entering said yarn delivering means into the large end of the tubes for delivering the yarns through the tubes.

71. In a tube threading machine, a tube frame support and means for holding the yarn ends in position to be threaded, in combination with needles moving transversely to the yarns and engaging the yarns to loop them over the ends of the needles and then push them through the tubes, and means for combing or brushing out the ends of the yarn after threading.

72. In a tube threading machine, a tube frame support and means for holding the yarn ends in position to be threaded, in combination with needles moving transversely to the yarns and engaging the yarns to loop them over the ends of the needles and then push them through the tubes, and means moving longitudinally of the yarn ends for combing or brushing out the yarn after threading and acting to hold the yarn ends during the withdrawal of the needles from the tubes.

73. In a tube threading machine, a tube frame support, a series of pusher needles, means for holding the yarn ends distended between the needles and the large ends of the tubes, and means to move the needles transversely the yarns to push the latter through the large ends of the tubes, the needle movement being interrupted when the needles are brought into position to engage the yarns, and means on the interruption of said needle movement to effect relative lateral movement between the yarns and the needles to wrap the yarns around the needles.

74. In a tube threading machine, a tube frame support, a series of pusher needles, means for holding the yarn ends distended between the needles and the side of the tube frame having large ends, means for moving the needles to thread the yarns through the tube frame large ends, said needles moving first to a position with their front ends between successive yarns, at which point the movement is interrupted but resumed to carry the yarns into the large ends of the tubes and through the tubes, the needles being then retracted, means to cause relative lateral thread-engaging movement between the needles and the yarns when the needle movement is interrupted to insure better engagement of the yarn by the needles, and means for stripping the yarns from the needles beyond the small ends of the tubes.

75. In a tube threading machine, a tube frame support, means for holding the tuft yarns in position to be threaded, a series of needles, means for causing relative movement between the needles and the tubes transversely the yarns to thread the latter through the tubes, and means for imparting a lateral yarn engaging movement to the needles.

76. In a machine for acting upon tuft yarns in carpet manufacture, the combination with means to hold a series of said yarns, means to support a tube frame in relation to the yarns to be threaded therethrough, a series of needles, and means to cause relative movement between the same and the tubes of the tube frame first to position the pushers through the large ends of the tubes and through the tubes, and then to position them without the tubes.

77. In a tube threading machine, a tube frame support and means for holding the yarn ends in position to be threaded, in combination with tube threading means, and means for combing or brushing out the ends of the yarn after threading.

In testimony whereof, I have signed my name to this specification, in the presence of two subscribing witnesses.

THOMAS P. WALSH.

Witnesses:
M. J. SPALDING,
EDWARD MAXWELL.